US 8,520,580 B2

(12) United States Patent
Ananthanarayanan et al.

(10) Patent No.: US 8,520,580 B2
(45) Date of Patent: Aug. 27, 2013

(54) SYNCHRONIZATION OF MOBILE CLIENT MULTICAST MEMBERSHIP

(75) Inventors: Shankar Kambat Ananthanarayanan, JP Nagar III Phase (IN); Ravinder Verma, Varthur Hobli (IN)

(73) Assignee: Aruba Networks, Inc., Sunnyvale, CA (US)

( * ) Notice: Subject to any disclaimer, the term of this patent is extended or adjusted under 35 U.S.C. 154(b) by 106 days.

(21) Appl. No.: 12/429,983

(22) Filed: Apr. 24, 2009

(65) Prior Publication Data

US 2010/0272103 A1    Oct. 28, 2010

(51) Int. Cl.
*H04L 12/66* (2006.01)
*H04W 4/00* (2009.01)

(52) U.S. Cl.
USPC .......................................... 370/312; 370/331

(58) Field of Classification Search
USPC .......................................... 370/331, 312, 328
See application file for complete search history.

(56) References Cited

U.S. PATENT DOCUMENTS

| 7,035,940 | B2 * | 4/2006 | Sahasrabudhe et al. ....... 709/242 |
| 7,792,025 | B2 * | 9/2010 | Segel et al. .................... 370/230 |
| 7,817,599 | B2 * | 10/2010 | Dorenbosch et al. .......... 370/331 |
| 7,852,794 | B2 * | 12/2010 | Venkatachalam ............. 370/312 |
| 7,970,416 | B2 * | 6/2011 | Kim .............................. 455/456.3 |
| 8,279,833 | B2 * | 10/2012 | Kang et al. .................... 370/331 |
| 2002/0131387 | A1 * | 9/2002 | Pitcher et al. ................ 370/338 |
| 2004/0132402 | A1 * | 7/2004 | Agashe et al. ................ 455/3.01 |
| 2005/0054349 | A1 * | 3/2005 | Balachandran et al. ...... 455/456.1 |
| 2005/0075107 | A1 * | 4/2005 | Wang et al. .................. 455/435.1 |
| 2005/0249142 | A1 * | 11/2005 | Kim et al. ..................... 370/312 |
| 2006/0221993 | A1 * | 10/2006 | Liao et al. ..................... 370/449 |
| 2006/0274693 | A1 * | 12/2006 | Nikander et al. ............. 370/331 |
| 2007/0086458 | A1 * | 4/2007 | Narayanan et al. ........... 370/390 |
| 2007/0153741 | A1 * | 7/2007 | Blanchette et al. ........... 370/331 |
| 2008/0031194 | A1 * | 2/2008 | Yaqub ........................... 370/331 |
| 2008/0132240 | A1 * | 6/2008 | Baek et al. .................... 455/442 |
| 2008/0151808 | A1 * | 6/2008 | O'Neill ......................... 370/312 |

(Continued)

OTHER PUBLICATIONS

Deering, Network Working Group Request for Comments: 1112, Obsoletes: RFCs 988, 1054, "Host Extensions for IP Multicasting", Aug. 1989, pp. 1-17.

(Continued)

*Primary Examiner* — Jae Y Lee
*Assistant Examiner* — Jay P Patel
(74) *Attorney, Agent, or Firm* — Blakely, Sokoloff, Taylor & Zafman LLP

(57) ABSTRACT

Synchronization of mobile multicast membership in a wireless network. A controller supports one or more wireless access points, each of which supports wireless clients. A Mobility Manager (MM) in the controller monitors wireless client activity. The controller establishes an IGMP proxy which intercepts IGMP messages from wireless clients and handles the IGMP messages on clients' behalf. When a wireless client wishes to join a multicast, the client's IGMP join message is intercepted by the controller IGMP proxy, and the controller IGMP proxy joins the multicast for the client. The Mobility Manager observes the actions of the IGMP proxy. If a client moves from its home agent (HA) controller to a different foreign agent (FA) controller, the Mobility Manager in the FA controller locates the Mobility Manager in the HA controller and receives information on the client including information on any multicast streams the client is receiving. The Mobility Manager in the FA controller uses this information to have its own IGMP proxy join the required multicast, and send the multicast stream to the client.

18 Claims, 1 Drawing Sheet

(56) References Cited

U.S. PATENT DOCUMENTS

| | | |
|---|---|---|
| 2008/0175238 A1* | 7/2008 | Venkatachalam ............. 370/390 |
| 2008/0225769 A1* | 9/2008 | Noisette et al. ................ 370/312 |
| 2009/0036152 A1* | 2/2009 | Janneteau et al. ............. 455/503 |
| 2009/0061881 A1* | 3/2009 | Gonsa et al. ................... 455/442 |
| 2009/0080359 A1* | 3/2009 | Song et al. ..................... 370/312 |
| 2009/0168680 A1* | 7/2009 | Singh et al. .................... 370/312 |
| 2009/0319845 A1* | 12/2009 | Liu et al. ........................ 714/747 |
| 2010/0172293 A1* | 7/2010 | Toth et al. ...................... 370/328 |
| 2010/0278091 A1* | 11/2010 | Sung et al. ..................... 370/312 |
| 2012/0039230 A1* | 2/2012 | Blanchette et al. ............ 370/312 |

OTHER PUBLICATIONS

Fenner, Network Working Group Request for Comments: 2236, Updates: 1112, Category: Standards Track, "Internet Group Management Protocol, Version 2", Nov. 1997, pp. 1-24.

Cain et al., Network Working Group Request for Comments: 3376, Obsoletes: 2236, Category: Standards Track, "Internet Group Management Protocol, Version 2", Oct. 2002, pp. 1-53.

* cited by examiner

SYNCHRONIZATION OF MOBILE CLIENT MULTICAST MEMBERSHIP

BACKGROUND OF THE INVENTION

The present invention relates to wireless systems, and in particular, to the problem of synchronizing multicast data streams to mobile clients in the wireless environment.

Modern wireless systems operating under IEEE 802.11 standards are called upon to support a wide range of clients operating over a wide range of data rates, using different modulation types, and different protocols.

The users of these networks see, or desire to see a set of services, available on demand, wherever they are. They expect these services to operate reliably, and continue to operate as they move, for example, from one area to another in an office environment, or from one building or floor to another in a corporate campus.

Broadcast/multicast (BCMC) traffic in an 802.11 wireless network belongs to a single broadcast domain, such as one or more wireless access nodes connected to a controller. This BCMC traffic cannot be leaked or shared across multiple different domains. This BCMC traffic is usually managed according through the well known Internet Group Management Protocol (IGMP) as defined for example in RFC 1112 (IGMP V1), RFC 2236 (IGMP V2) and RFC 3376 (IGMP V3), each incorporated herein by reference.

When a mobile client crosses a Layer 3 (L3) boundary, for example moving from an area covered by one controller and its wireless access nodes to an area covered by a different controller and its wireless access nodes, existing protocols allow the wireless client to retain its IP address.

But the BCMC traffic to and from the client is restricted to a single broadcast domain. When the mobile client crosses a L3 boundary, these BCMC sessions are dropped until the client rejoins these BCMC sessions.

What is needed is a way to maintain multicast membership and sessions as wireless clients move across boundaries.

BRIEF DESCRIPTION OF THE DRAWINGS

The invention may be best understood by referring to the following description and accompanying drawings that are used to illustrate embodiments of the invention in which.

DETAILED DESCRIPTION

Figure 1:
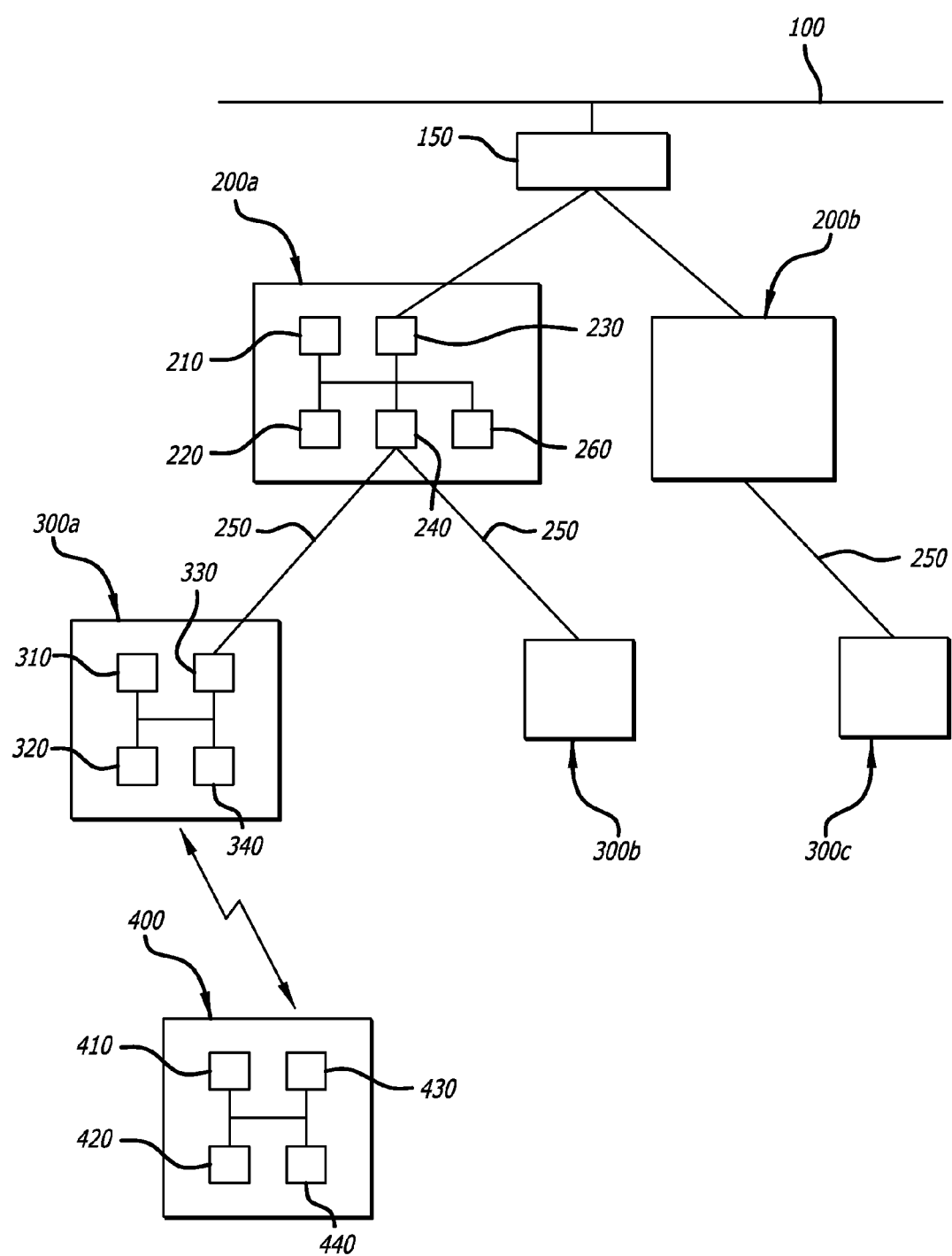
FIG. 1 shows a wireless 802.11 network.

Embodiments of the invention relate to methods of synchronizing mobile client multicast membership in wireless data networks. According to an aspect of the invention, a controller supports one or more wireless access nodes, the access nodes supporting wireless clients. A Mobility Manager (MM) in the controller monitors the activity of the wireless clients. When a wireless client attempts to join a multicast group using an IGMP multicast join, an IGMP proxy in the controller intercepts these IGMP control messages, joining the multicast group for the client, and establishing itself as the client's home agent (HA). This activity is tracked by the Mobility Manager. Subsequent IGMP messages from that or other clients on the controller are handled by the IGMP proxy acting on their behalf, and are also tracked by the Mobility Manager. The IGMP proxy in the controller performs joins and acts as a host for each BCMC client of its wireless access nodes.

When a client moves from its home agent (HA) controller to a foreign agent (FA) controller, downstream multicast traffic for the client is still received by the IGMP proxy at the HA. The Mobility Manager in the FA contacts the Mobility Manager in the HA and receives information on any active multicast traffic associated with the client; the Mobility Manger in the FA then establishes those multicast connections for the client through its own IGMP proxy, which forwards the multicast streams to the client.

As shown in FIG. 1, a wireless network operating according to 802.11 standards supports connections of wireless clients 400 to a wired network. Wired network 100, such as a wired IEEE 802.3 Ethernet network, is connected to layer 3 router 150, which supports controllers 200a, 200b. Controllers 200 support connections 250 to access nodes 300a, 300b, 300c. These access nodes provide wireless communications to wireless clients such as wireless client 400.

As is understood in the art, controllers 200 are a purpose-built digital devices having a CPU 210, memory hierarchy 220, and a plurality of network interfaces 230, 240. CPU 210 may be a MIPS-class processor from companies such as Raza Microelectronics or Cavium Networks, although CPUs from companies such as Intel, AMD, IBM, Freescale, or the like may also be used. Memory hierarchy 220 includes read-only memory for device startup and initialization, high-speed read-write memory such as DRAM for containing programs and data during operation, and bulk memory such as hard disk or compact flash for permanent file storage of programs and data. Network interface 230 is typically an IEEE 802.3 Ethernet interface to copper, although high-speed optical fiber interfaces may also be used. Controller 200 typically operates under the control of purpose-built embedded software, typically running under a Linux operating system, or an operating system for embedded devices such as VXWorks. Network interface 240 is typically a wireless interface operating under IEEE 802.11 standards.

Similarly, as understood by the art, wireless access nodes 300a, 300b and 300c, are also purpose-built digital devices. These access nodes include CPU 310, memory hierarchy 320, wired interface 330, and wireless interface 340. As with controller 200, the CPU commonly used for such access nodes is a MIPS-class CPU such as one from Raza Microelectronics or Cavium Networks, although processors from other vendors such as Intel, AMD, Freescale, and IBM may be used. The memory hierarchy comprises read-only storage for device startup and initialization, fast read-write storage such as DRAM for holding operating programs and data, and permanent bulk file storage such as compact flash. Wireless access nodes 300 typically operate under control of purpose-built programs running on an embedded operating system such as Linux or VXWorks. Wireless interface 340 is typically an interface operating to the family of IEEE 802.11 standards including but not limited to 802.11a, b, g, and/or n.

Wireless client 400 is also a digital device, similarly having CPU 410, memory hierarchy 420, wireless interface 430, and I/O devices 440. As examples, wireless device 500 may be a general purpose computer such as a laptop, or may be a purpose-built device such as a Wi-Fi phone or a handheld scanner. In a general-purpose computer, CPU 410 may be a processor from companies such as Intel, AMD, Freescale, or the like. In the case of purpose-built devices, Acorn or MIPS class processors may be preferred. Memory hierarchy 420 comprises the similar set of read-only memory for device startup and initialization, fast read-write memory for device operation and holding programs and data during execution, and permanent bulk file storage using devices such as flash, compact flash, and/or hard disks. Additional I/O devices 440 may be present, such as keyboards, displays, speakers, barcode scanners, and the like.

According to an aspect of the invention, Mobility Manager (MM) 270 operates in controller 200a, monitoring the activity of connected wireless clients. Assuming client 400 is connected to controller 200a through access node 300a, when wireless client 400 issues an IGMP control message, this IGMP control message is intercepted by controller 200a. If an IGMP proxy process 250 does not exist on controller 200a, one is started. This IGMP Proxy 250 will trap and handle all IGMP messages from wireless clients of controller 200a, and act in their behalf.

As an example, if client 400 sends an IGMP join to join a multicast, IGMP Proxy 250 on controller 200a will trap this request, and then send its own IGMP join request upstream, joining the multicast as a proxy for client 400. The IGMP Proxy on controller 200a can act as a host for other wireless clients wishing to join the same (or a different) multicast.

The activity of IGMP Proxy 250 is monitored by Mobility Manager 270. As is understood by the art, this may be through the use of shared data structures or other software methods whereby Mobility Manager 270 tracks the activities of client 400 including any activity of client 400 through IGMP proxy 250. It is understood that Mobility Manager 270 is a software process running in controller 200. Mobility Manager 270 may be written in any number of different computer languages such as C or C++, depending on the implementation requirements of the other software components of the controller.

If client 400 moves to a different wireless access node and controller, for example controller 200b through access node 300c, downstream unicast traffic for client 400 will be forwarded to client 400 through the new controller 200b. Multicast traffic, however, is not forwarded.

According to an aspect of the invention, when client 400 roams from home agent (HA) controller 200a to foreign agent (FA) controller 200b, the Mobility Manager 270 in FA controller 200b sends queries to Mobility Managers 270 in all controllers 200 in its mobility domain to determine the HA controller for client 400. When the Mobility Manager 270 in controller 200a identifies itself as the HA for client 400, the Mobility Manager 270 in HA controller 200a sends information to Mobility Manager 270 in FA controller 200b, including information on any open IGMP multicasts being handled for client 400 through the IGMP proxy 250 in HA 200a. Mobility Manager 270 in FA controller 200b then uses this information with its own IGMP proxy to join the required multicasts and send the multicast traffic to client 400.

This process is facilitated by having the IGMP proxy 250 in each controller 200 keep multicast databases of the clients 400 it serves and sharing this information with the Mobility Manager in the controller. When a client roams from its home agent to a foreign agent, the Mobility Manager in the foreign agent locates the home agent and receives information from the Mobility Manager in the home agent, including information on active multicast streams for the client.

While the invention has been described in terms of various embodiments, the invention should not be limited to only those embodiments described, but can be practiced with modification and alteration within the spirit and scope of the appended claims. The description is this to be regarded as illustrative rather than limiting.

What is claimed is:

1. A method comprising:
   subsequent to a client associating with a first access node and the client being communicatively coupled with a first controller through the first access node: storing, by the first controller, information on one or more of: active broadcast sessions for the client or active multicast sessions for the client;
   subsequent to the client associating with a second access node and the client being communicatively coupled with a second controller through the second access node:
   detecting, by the second controller, that the client is communicatively coupled to the second controller through the second access node;
   responsive at least to detecting that the client is communicatively coupled to the second controller: sending, by the second controller, an inquiry to one or more other controllers comprising the first controller for the information on one or more of: the active broadcast sessions for the client or the active multicast sessions for the client;
   receiving, by the second controller from the first controller, the information on one or more: the active broadcast sessions for the client or the active multicast sessions for the client;
   using, by the second controller, the information to establish one or more of: the active broadcast sessions for the client or the active multicast sessions for the client,
   wherein the second controller comprises a hardware processor.

2. The method of claim 1 further comprising: responding, by the first controller to requests from the one or more other controllers, with information on active broadcast sessions for other clients.

3. The method of claim 1 further comprising: responding, by the first controller to requests from the one or more other controllers, with information on active multicast sessions for other clients.

4. The method of claim 1 further comprising establishing, by the second controller, the one or more of: the active broadcast sessions for the client or the active multicast sessions for the client using an IGMP proxy of the controller.

5. The method of claim 1 further comprising:
   receiving, by the second controller, a first IGMP join request for a second client to join a multicast subscription;
   responsive to receiving the first IGMP join request for a second client to join a multicast subscription, transmitting a second IGMP join request for the controller to join the multicast subscription.

6. The method of claim 1 further comprising receiving, by the second controller from the first controller, a forwarded unicast message directed to the client.

7. A non-transitory computer readable medium comprising instructions which, when executed by one or more hardware processors, cause performance of operations comprising:
   subsequent to a client associating with a first access node and the client being communicatively coupled with a first controller through the first access node: storing, by the first controller, information on one or more of: active broadcast sessions for the client or active multicast sessions for the client;
   subsequent to the client associating with a second access node and the client being communicatively coupled with a second controller through the second access node:
   detecting, by the second controller, that the client is communicatively coupled to the second controller through the second access node;
   responsive at least to detecting that the client is communicatively coupled to the second controller: sending, by the second controller, an inquiry to one or more other controllers comprising the first controller for the information on one or more of: the active broadcast sessions for the client or the active multicast sessions for the client;

receiving, by the second controller from the first controller, the information on one or more: the active broadcast sessions for the client or the active multicast sessions for the client;

using, by the second controller, the information to establish one or more of: the active broadcast sessions for the client or the active multicast sessions for the client.

8. The medium of claim 7 wherein the operations further comprise responding, by the first controller to requests from the one or more other controllers, with information on active broadcast sessions for other clients.

9. The medium of claim 7 wherein the operations further comprise responding, by the first controller to requests from the one or more other controllers, with information on active multicast sessions for other clients.

10. The medium of claim 7 wherein the operations further comprise establishing, by the second controller, the one or more of: the active broadcast sessions for the client or the active multicast sessions for the client using an IGMP proxy of the controller.

11. The medium of claim 7 wherein the operations further comprise:

receiving, by the second controller, a first IGMP join request for a second client to join a multicast subscription;

responsive to receiving the first IGMP join request for a second client to join a multicast subscription, transmitting a second IGMP join request for the controller to join the multicast subscription.

12. The medium of claim 7 wherein the operations further comprise receiving, by the second controller from the first controller, a forwarded unicast message directed to the client.

13. A system comprising:

a first controller comprising one or more hardware processors;

a second controller comprising one or more hardware processors;

the system being configured to perform operations comprising:

subsequent to a client associating with a first access node and the client being communicatively coupled with the first controller through the first access node: storing, by the first controller, information on one or more of: active broadcast sessions for the client or active multicast sessions for the client;

subsequent to the client associating with a second access node and the client being communicatively coupled with the second controller through the second access node:

detecting, by the second controller, that the client is communicatively coupled to the second controller through the second access node;

responsive at least to detecting that the client is communicatively coupled to the second controller: sending, by the second controller, an inquiry to one or more other controllers comprising the first controller for the information on one or more of: the active broadcast sessions for the client or the active multicast sessions for the client;

receiving, by the second controller from the first controller, the information on one or more: the active broadcast sessions for the client or the active multicast sessions for the client;

using, by the second controller, the information to establish one or more of: the active broadcast sessions for the client or the active multicast sessions for the client.

14. The system of claim 13 wherein the operations further comprise responding, by the first controller to requests from the one or more other controllers, with information on active broadcast sessions for other clients.

15. The system of claim 13 wherein the operations further comprise responding, by the first controller to requests from the one or more other controllers, with information on active multicast sessions for other clients.

16. The system of claim 13 wherein the operations further comprise establishing, by the second controller, the one or more of: the active broadcast sessions for the client or the active multicast sessions for the client using an IGMP proxy of the controller.

17. The system of claim 13 wherein the operations further comprise:

receiving, by the second controller, a first IGMP join request for a second client to join a multicast subscription;

responsive to receiving the first IGMP join request for a second client to join a multicast subscription, transmitting a second IGMP join request for the controller to join the multicast subscription.

18. The system of claim 13 wherein the operations further comprise receiving, by the second controller from the first controller, a forwarded unicast message directed to the client.

* * * * *